Figure 1:
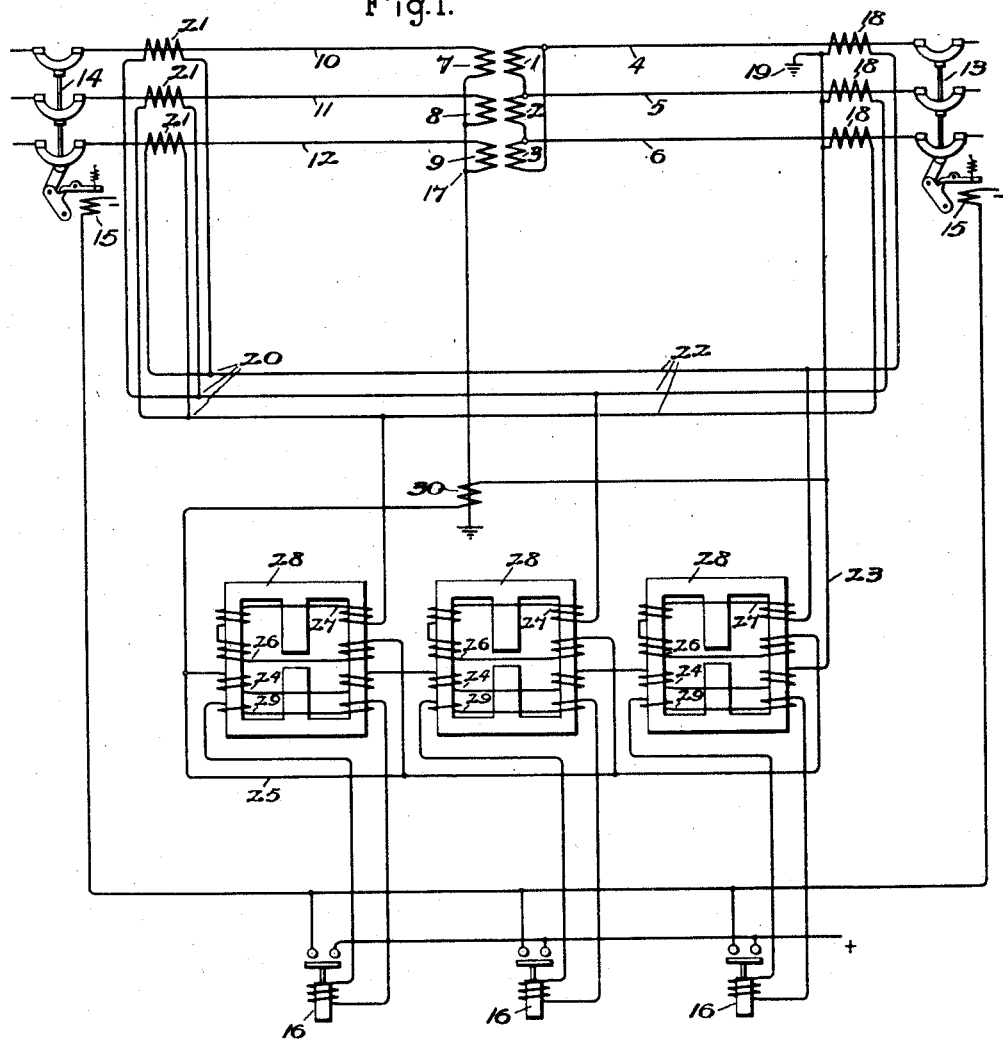

Sept. 21, 1926.

A. S. FITZ GERALD 1,600,872

PROTECTIVE ARRANGEMENT

Filed Feb. 9, 1925   3 Sheets-Sheet 1

Inventor:
Alan S. FitzGerald;
by
His Attorney.

Sept. 21, 1926.

A. S. FITZ GERALD 1,600,872

PROTECTIVE ARRANGEMENT

Filed Feb. 9, 1925

3 Sheets-Sheet 2

Inventor:
Alan S. Fitz Gerald
by *Alexander S. Smith*
His Attorney.

Sept. 21, 1926.

A. S. FITZ GERALD

PROTECTIVE ARRANGEMENT

Filed Feb. 9, 1925

1,600,872

3 Sheets-Sheet 3

Inventor:
Alan S. FitzGerald;
by *Alexander S. Lunt*
His Attorney.

Patented Sept. 21, 1926.

1,600,872

UNITED STATES PATENT OFFICE.

ALAN STEWART FITZ GERALD, OF SCHENECTADY, NEW YORK, ASSIGNOR TO GENERAL ELECTRIC COMPANY, A CORPORATION OF NEW YORK.

PROTECTIVE ARRANGEMENT.

Application filed February 9, 1925, Serial No. 7,778, and in England February 25, 1924.

My invention relates to improvements in protective arrangements for polyphase alternating current circuits and apparatus having windings connected, respectively, in star and delta, such, for instance, as a star-delta power transformer.

More particularly my invention relates to arrangements for protecting this type of transformer or the like according to the differential or balanced system of protection, wherein the input is balanced against the output by means of current transformers having their primaries connected respectively, on each side of the star-delta transformer and their secondaries, respectively, in delta and star in a protective circuit adapted in normal conditions to be balanced. Protective relays, or equivalent electro-responsive devices, are connected to this protective circuit to control the operation of the star-delta transformer in response to out-of-balance currents in the protective circuit. The primitive relays, which may be balanced-arm, differential or the like relays, or equivalent electro-responsive devices, may when energized complete the circuit of a tripping coil or an auxiliary signalling or indicating circuit in a well known manner.

It is desirable that the protective system shall operate with greater sensitivity in the case of earth faults than in the case of the inter-phase faults occurring upon the star-delta transformer to be protected, and the inter-phase fault protecting means should not be so sensitive as to be operated by out-of-balance effects, due to the magnetizing current, which may be considerable when switching on or in the event of a sudden potential rise on the star-delta transformer.

It will readily be understood that out-of-balance effects, due to this magnetizing current, which flows only in the primary windings of the power transformer, will appear in the protective circuit in the form of an inter-phase fault and not as an earth fault, and, owing to the high values which inter-phase faults usually reach, the protective relay or equivalent electro-responsive device for dealing with this type of fault may be relatively insensitive, that is, compared with the protective means dealing with earth faults. For the purpose of this specification, such an out-of-balance current is deemed to be a small inter-phase fault.

In carrying out the invention, the protective circuit may be arranged according to the circulating current system, the secondary windings of the current transformers on the delta side of the star-delta power transformer being end-connected, and also connected to points across which the secondary windings of the current transformers on the star side of the star-delta power transformer are connected in delta. The common point of the secondary windings of the current transformers on the delta side of the star-delta power transformer may then be connected through protective relays or equivalent electro-responsive devices to equi-potential points in the circuit joining the secondary windings of the two sets of current transformers. Whether the neutral point of the star windings of the star-delta power transformer be earthed or not, an additional winding provided on each of the protective relays or equivalent electro-responsive devices is energized by earth fault currents on the star or delta side of the star-delta power transformer to cause the operation of at least one of the protective relays or equivalent electro-responsive devices with greater sensitivity in the case of earth faults than inter-phase faults.

Each protective relay or equivalent device may be provided with a restraining winding in series with its operating winding, the effect of which is to render it relatively insensitive, the ratio of the turns of each winding being such as to cause operation only when the current reaches a predetermined high value. In order to obtain sensitivity to earth faults, the additional winding referred to above may be in the nature of a debiasing winding, inductively related to the restraining winding, and adapted when energized in response to an earth fault to oppose or neutralize the effect of the restraining winding.

In a modification of my invention, relatively insensitive relays may be provided for dealing with inter-phase faults, and instead of the additional windings mentioned above, an additional relatively sensitive relay is provided, the operating winding of which is energized responsively to earth fault currents on either the star or the delta windings of the power transformer.

My invention will be better understood from the following description taken in connection with the accompanying drawings and its scope will be pointed out in the appended claims.

Figure 2:
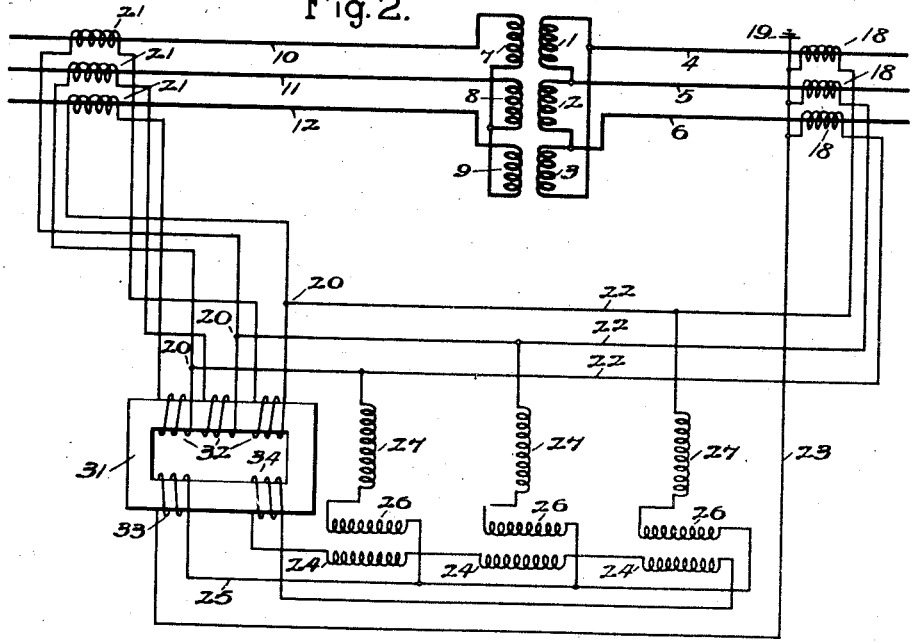
Figure 4:
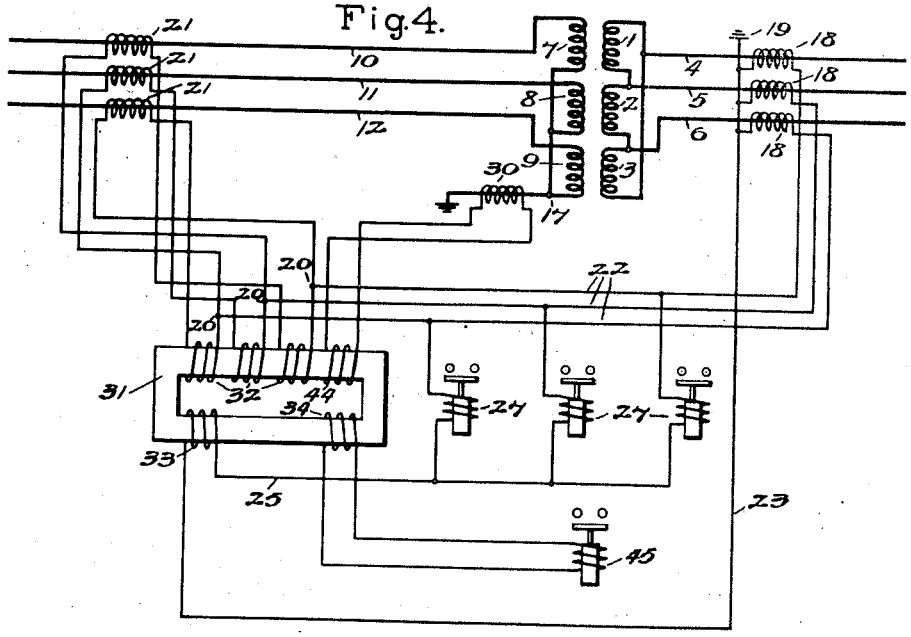
Figure 3:
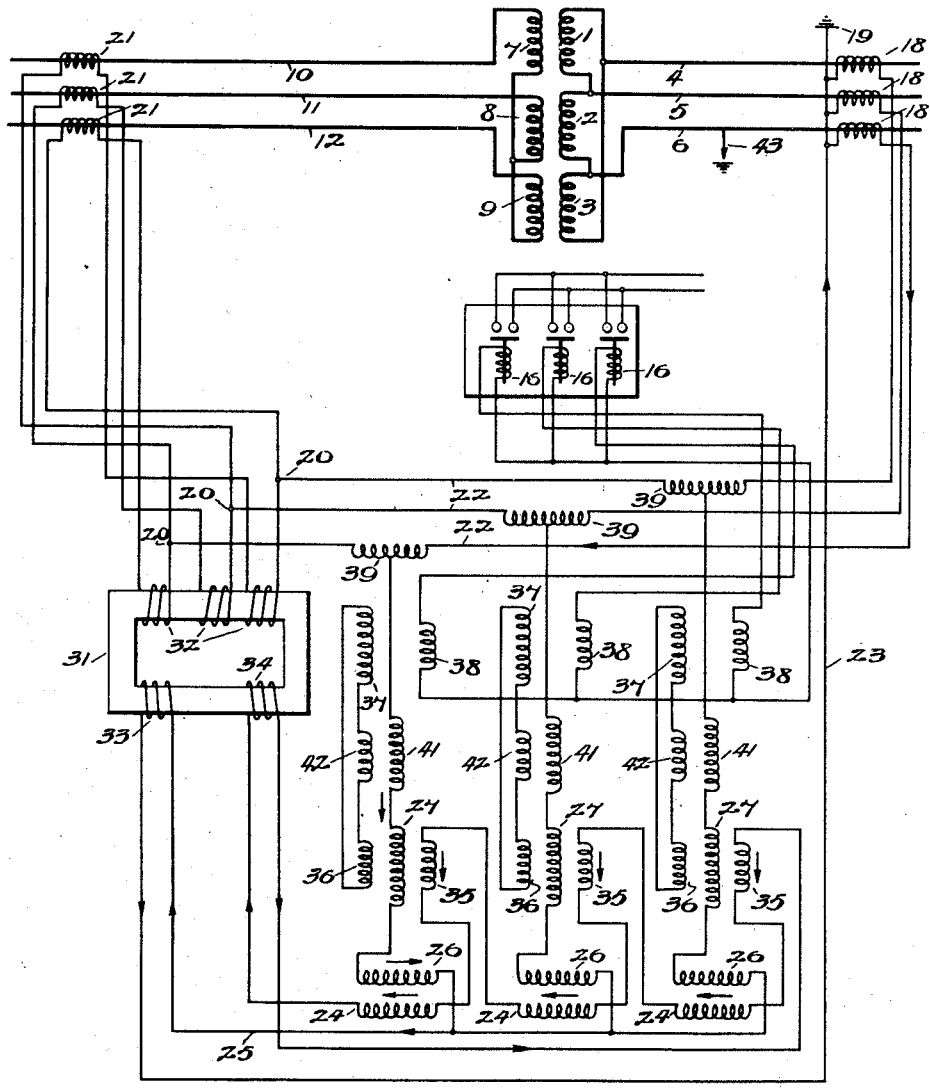

In the accompanying drawings, Fig. 1 illustrates diagrammatically an embodiment of my invention applied to a star-delta transformer having the neutral point of its star windings grounded; Fig. 2 illustrates diagrammatically a modification of my invention applied to a star-delta transformer having the neutral point ungrounded; Fig. 3 illustrates diagrammatically a modification of the embodiment of my invention shown in Fig. 2; and Fig. 4 illustrates diagrammatically another embodiment of my invention for cases where the neutral point of the star windings of the star-delta transformer may or may not be grounded.

The electro-responsive devices previously referred to may comprise one or more biasing transformers and a simple relay, the simple relay, when energized, completing the trip or auxiliary circuit in a manner well understood. The biasing transformer is defined as a transformer having an operating or primary winding connected to receive operating current, a secondary winding inductively related thereto, and a restraining winding so disposed as to produce substantially no electromotive force at the terminals of the operating and secondary windings, but adapted to receive a current for setting up a flux which will regulate the inductive relation between the operating and secondary windings. An air-gap or equivalent reluctance may be provided in the magnetic circuit of the restraining winding. The secondary winding may be connected to the simple relay, or to the operating winding of a second biasing transformer, the secondary winding of which is connected to the simple relay. The biasing transformer is more fully described in my Letters Patent 1,468,441 of the United States for protective device for electric distribution systems, issued September 18, 1923, and also in my Letters Patent 1,560,934 of the United States for alternating electric current protective apparatus, issued November 10, 1925, both assigned to the same assignee as this invention.

In the arrangement shown in Fig. 1, a power transformer has windings 1, 2 and 3 connected in delta with conductors 4, 5 and 6 respectively and windings 7, 8 and 9 connected in star, with conductors 10, 11 and 12 respectively. The circuits comprising the conductors 4, 5, 6 and 10, 11, 12 are arranged to be controlled by circuit breakers 13 and 14, respectively, through trip coils 15 arranged to be controlled by electro-responsive devices comprising relays 16. In Figs. 2, 3 and 4, the circuit breakers are omitted for the sake of clearness and in Fig. 2 the relays are also omitted but in these figures the application of the relays and circuit breakers will be obvious from the showing in Fig. 1. The neutral point 17 of the star connected windings 7, 8 and 9 is earthed. Current transformers 18, the primaries of which are the conductors 4, 5, 6 connected with the delta windings 1, 2, 3, have their secondaries end-connected to earth as at 19, and their other ends connected to points 20. Current transformers 21 the primaries of which are the conductors 10, 11, 12 connected with the star windings 7, 8, 9 of the power transformer, are connected in delta across the points 20. The ratio of the interconnected current transformers 18 and 21 respectively in such that a condition of balance obtains in the conductors 22 in normal circumstances. The common point of the secondary windings of the current transformers 18 is connected by a conductor 23 in series with three windings 24 to the common lead 25 of the windings 26, each of which is in series with one of the windings 27 which are connected to normally equipotential points of the circuit comprising conductors 22. The windings 24, which are, in effect, debiasing windings, are arranged in inductive relation respectively to the windings 26 so as to oppose or neutralize, when energized by like currents, the effect of currents in windings 26. The windings 26, and also the windings 24, are so disposed as to produce substantially no electromotive force at the terminals of the windings 27, which are operating windings. The windings 26 are restraining windings and the effect of current therein is to oppose the effect of current in the operating windings 27 from causing operation in certain circumstances. Each group of windings 24, 26 and 27 are the windings of a separate protective relay or equivalent electro-responsive device. If, as shown, a biasing transformer comprising a core 28 is part of the latter, an additional or secondary winding 29 inductively related to the operating winding 27 will be provided, the relays 16 being connected in circuit with the windings 29. A current transformer 30, the primary of which is the lead to earth from the neutral point 17 of the star windings 7, 8, 9 of the power transformer has its secondary connected across the three debiasing windings 24 in series.

The operation of this arrangement is as follows:—

In all normal conditions of balance, current will circulate in the conductors 22, but no current will pass through the windings 24, 26 or 27. When an inter-phase fault occurs on the power transformer, or on the circuit thereof in the protected zone between the current transformers 18 and 21, the condition of balance in conductors 22 is no longer maintained and out-of-balance currents will circulate through two or more of the operating windings 27 and their series connected restraining windings 26. The relation of each restraining winding to its series connected operating winding may be such as to cause the protective arrangement to operate when this out-of-balance current reaches a predetermined value. In these circumstances, there is no current in the additional or debiasing windings 24, nor in the conductor 23. When an earth fault occurs on the delta windings 1, 2, 3 of the power transformer, corresponding out-of-balance currents will appear in at least one of the secondaries of the current transformers 18, in the conductor 23, all the windings 24, in at least one of the operating and restraining windings 27 and 26, and in the corresponding conductor or conductors 22. Thus, one at least of the protective relays or equivalent electro-responsive devices will be energized. The effect of current in one of the windings 24 will counteract or neutralize the restraining effect of the restraining winding 26 of the energized protective relay or equivalent electro-responsive device. Thus one of the protective relays or equivalent electro-responsive devices will operate with great sensitivity, and, of course, it is only necessary for one to act for the power transformer to be completely protected. It will be obvious that, if the fault embraces two or more of the phases, two or more of the protective relays will be energized. When an earth fault occurs on one of the star windings 7, 8, 9 of the power transformer, (and as these windings are earthed, such a fault must be fed in from the delta side of the power transformer) an out-of-balance current is induced in the secondary winding of the current transformer 30 and all the windings 24 become energized thereby. Also, the operating windings 27 and the restraining windings 26 of two of the protective relays or equivalent electro-responsive devices become energized through out-of-balance currents induced in two of the secondaries of current transformers 18. Owing to the vectorial relation between the currents in the windings 24 and the other windings of the protective relays or equivalent electro-responsive devices, the effect of current in one of the windings 24 will be to neutralize the effect of the restraining winding 26 of one of the energized protective relays or equivalent electro-responsive devices and the effect of current in one of the windings 24 will assist the effect of the restraining winding 26 of the other energized protective relay or equivalent electro-responsive devices. Thus one of the protective relays or equivalent electro-responsive devices will operate with great sensitivity. Consequently, in the event of an earth fault occurring on either winding of the power transformer, one of the windings 24 is energized to oppose or neutralize the effect of one of the windings 26, thus allowing the operating winding 27, connected in series with this restraining winding 26, to cause operation of the protective means with considerably greater sensitivity than in the case of an inter-phase fault previously described.

In the arrangement shown in Fig. 2, the star-windings 7, 8, 9 of the power transformer are not earthed. The secondary windings of the current-transformers 18 and 21 are connected to the points 20 as has been described in connection with Fig. 1. The conductor 23 from the neutral point of the secondary windings of the current transformers 18 is connected to the common conductor 25 of the windings 26 and 27. In addition, a transformer 31, hereinafter referred to as a summation transformer, is provided with a plurality of primary windings 32, each one in series with the secondary windings of the current transformers 21. The windings 32 all have the same number of turns. A primary winding 33 on the core of the summation transformer 31 is connected between the conductors 23 and 25. A secondary winding 34 on the same core is connected in a closed circuit in series with the debiasing windings 24.

The operation of this arrangement is as follows: In normal conditions, no currents are found in any of the windings 24, 26, 27, 33 and 34. Currents circulate in the conductors 22 and in the windings 32, but the resultant effect of the currents in the windings 32 is substantially zero, and the core of the summation-transformer 31 is not, therefore, magnetized. When an inter-phase fault occurs on either the star or the delta windings of the power transformer, an out-of-balance current will appear in at least two of the operating windings 27 and their series-connected restraining windings 26. The ratio of the windings 26 to the windings 27 may be such as to produce operation of the protective means when the out-of-balance current reaches a predetermined high value. In these circumstances, the windings 24, 33 and 34 are not energized. When an earth fault occurs on the delta windings 1, 2, 3 of the power transformer, an out-of-balance current appears in the conductor 23 and energizes the winding 33. When an earth fault occurs on the star windings 7, 8, 9 of the power transformer, the resultant effect of the currents in the windings 32 is no longer substantially zero and the core of the summation transformer 31 is thereby magnetized an amount corresponding to the earth fault current. Consequently, whether an earth fault occurs on the delta windings 1, 2, 3 or on the star windings 7, 8, 9 of the power transformer, the core of the summation transformer 31 is magnetized either by means of the winding 33 in accordance with the resultant of the currents energizing the current transformers 18 or the windings 32 in accordance with the resultant of the currents energizing the current transformers 21 and therefore the windings 34 and 24 become energized. In either of these earth fault cases, the operating winding 27 and the restraining winding 26 of at least one of the electro-responsive devices are energized. Consequently, as in the case of Fig. 1, the protective arrangement will operate with greater sensitivity in the case of an earth fault than in the case of an inter-phase fault. Faults beyond the power transformer, whether earth or inter-phase faults, will not produce current in any of the operating windings 26. An earth fault beyond the power transformer will, however, magnetize the core of the summation transformer 31 through windings 32, and consequently the debiasing windings 24 will be energized, but these latter windings, being so disposed as to produce substantially no electromotive force at the terminals of the operating windings 27, cannot cause the operation of the electro-responsive devices.

In the arrangement shown in Fig. 3, which is a modification of that described in connection with Fig. 2, each electro-responsive device is shown as comprising two biasing transformers having windings 24, 26, 27, 35 and 36 and windings 37, 38 and 39 respectively. The simple relays associated with these electro-responsive devices are indicated by 16. An additional transformer having primary and secondary windings 41 and 42 respectively is associated with each electro-responsive device. The windings 35 are connected in series with the debiasing windings 24 across the winding 34 and are arranged in inductive relation, respectively, to the windings 27 and so as to assist the latter when energized by like current. The windings 41, respectively, are connected in series with the windings 27, and the windings 39 are connected in the conductors 22 to provide an overload restraining effect. The secondary windings 36 are connected, respectively, to the secondary windings 42 in series with the operating windings 37 of the biasing transformers comprising the windings 37, 38 and 39. The secondary windings 38 of these biasings transformers are adapted when energized, to operate the simple relays 16. The biasing transformers 37, 38 and 39 are preferably provided with an air-gap reluctance in the magnetic circuit of the restraining winding 39, so that there will be no appreciable restraining effect therefrom until current therein reaches a predetermined value.

The operation of this arrangement is as follows: In normal conditions, current circulates in the conductors 22 and the restraining windings 39, but no current flows in the windings 34, 26, 27 and 41. In the event of a through fault being fed through the power transformer to a section beyond the protected zone, when out-of-balance currents may be set up in the protective circuit due to inequalities in the characteristics of the current transformers 18 and 21, or due to other causes, the restraint afforded by the windings 39 is sufficient to prevent the operation of the protective arrangement in response to any of these out-of-balance currents. In the event of an inter-phase fault occuring on either side of the power transformer, a corresponding out-of-balance current will appear in the protective circuit energizing the restraining windings 26 and the operating windings 27, as previously described, in connection with Figs. 1 and 2 and also energizing at least two of the primary windings 41. The ratio of the turns of the primary windings 41 to the secondary windings 42 is such that sufficient current will be caused to flow through windings 37 to energize the secondary windings 38 in spite of the restraining effect, if any should be present, of the windings 39. The biasing transformer comprising windings 24, 26, 27, 35 and 36 will slightly assist this operation. In the event of an earth-fault occuring on either the delta or the star windings of the power transformer, the winding 34 will become energized, either through the winding 33 or through the windings 32 respectively and will energize the debiasing windings 24 to oppose the effect of one of the windings 26, as previously described in connection with Figs. 1 and 2. In addition, the windings 35 are also excited to assist the operating effect of one of the windings 27. In either case, the result is greater sensitivity in the protective arrangement in the case of earth faults upon the power transformer than in the case of inter-phase faults. In the case of earth faults, the restraining winding 26 of at least one of the biasing transformers is opposed or neutralized and the additional operating winding 35 on this biasing transformer is energized; whereas, in the case of inter-phase faults, the operation of the protective means is effected by means of the operating windings 41 and 27 in the presence of the restraint offered by windings 26.

At a given instant, a fault to earth on one of the phases of the delta windings as indicated at 43 of the power transformer may set up in the protective circuits out-of-balance currents indicated in direction by the arrows.

It will be obvious that the restraining windings 39 and the operating windings 41 or the additional operating windings 35 or both may be incorporated in the arrangement described in connection with Fig. 1. It will be obvious, also, that in cases in which the neutral point of the star windings 7, 8, 9 of the power transformer may sometimes be earthed and sometimes not earthed, adequate protection will be afforded by a combination of the arrangement described in connection with Fig. 1 with that of Fig. 2 or of Fig. 3. The necessary connections will be easily understood from a consideration of the following description.

The arrangement shown in Fig. 4 is the preferred arrangement. It is simpler than that described in connection with the previous figures, and provision is made for the protection of a star-delta transformer, the neutral point of the star-windings of which may be connected to earth upon occasions, but not always. The secondary winding of the current transformer 30 is connected directly to a primary winding 44, upon the core of the summation transformer 31, and the winding 44 is in opposition to the primary windings 32. The restraining windings 26 are omitted and the operating windings 27 are shown as simple relays. Instead of the debiasing or additional windings 24 there is provided an additional protective relay or the like the operating winding 45 of which is connected across the secondary winding 34 of the summation transformer 31.

The operation of this arrangement is as follows: When conditions are normal, current circulates in the leads 22, but none of the operating windings or relays 27 is energized and the resultant effect of the currents in the windings 32 is substantially zero. In the case of an inter-phase fault occurring upon either of the windings of the power transformer, the same conditions prevail except that at least two of the operating windings or relays 27 are now energized to operate the protective means. In the event of an earth fault occurring upon the delta windings 1, 2, 3 of the power transformer, an out-of-balance current flows in the conductor 23 and energizes the winding 33 and at least one of the operating windings 27. In the event of an earth-fault occurring upon the star-windings 7, 8, 9 of the power transformer, an out-of-balance current appears in the winding 44 of the summation transformer 31. If the star windings 7, 8, 9 are not earthed as shown in Fig. 4, the out-of-balance currents due to an earth-fault upon the star windings will then appear in the windings 82. In any of these three cases of earth-faults, the core of the summation-transformer 31 is magnetized to induce current in the winding 34 and thus cause the operation of the protective relay or equivalent electro-responsive device having the winding 45. As this electro-responsive device is responsive only to earth-faults, it may be made extremely sensitive, and the protective relays which are responsive to inter-phase faults, having the operating windings 27, may be considerably less sensitive in order that they will not operate in response to out-of-balance currents due to the magnetizing current of the power transformer or due to other conditions. In the event of an earth fault occurring on the star side of the star-delta transformer outside the protected zone, both windings 32 and winding 44 will energize the core of the summation transformer 31, but as they are opposed to and neutralize one another, no current will be induced in winding 34. This insures discriminating protection on earth-faults fed through the delta connected current transformers 21.

When an alternating current generator suddenly loses its load, a transient rise in potential occurs. With highly saturated transformers such a rise may cause an enormous increase in magnetizing current in a transformer connected to the generator. So far as a circulating current protective system is concerned, this is definitely a difference current and corresponds to a fault and consequently sensitive fault settings are difficult to maintain. The embodiment of my invention shown in Fig. 4 is particularly adapted to take care of such a situation, since the settings of the relays 27 may be sufficiently high to be clear of any magnetizing current disturbance and since the relay 45 is not affected by the magnetizing current. Assuming the generator to be connected for example between the delta connected windings 1, 2, 3 of the transformer and the current transformers 18 and to have its neutral point earthed, then the relays 27 will be operative on the occurrence of faults between phases on the generator, transformer primary or transformer secondary windings while the relay 45 will be operative only on an earth fault on the generator or transformer windings and neither of the relays will be directly affected by through interphase and earth faults which may be fed by the apparatus protected.

What I claim as new and desire to secure by Letters Patent of the United States is:—

1. A protective arrangement for a star-delta transmission system wherein the secondaries of current transformers on the star and the delta sides of the system are connected in delta and in star respectively and interconnected normally for circulating current, comprising a winding connected to be energized by current proportional to the resultant of the primary currents in each set of current transformers.

2. A protective arrangement for a star-delta connected transmission system wherein the neutral point of the star side of the system is connected to earth and wherein the secondaries of current transformers on the star and the delta sides of the system are connected in delta and in star respectively and interconnected for circulating current, a current transformer in the earth connection of the star side of the system and fault responsive means comprising a winding connected to be energized on the occurrence of a fault to earth on the star side of the system by a current proportional to the current in the current transformer in the earth connection.

3. A protective arrangement for a star-delta connected transmission system wherein the neutral point of the star side of the system is connected to earth and wherein the secondaries of current transformers on the star and the delta sides of the system are connected in delta and in star respectively and interconnected for circulating current, fault responsive means comprising a winding connected between the neutral point of the star connected current transformer secondaries and a neutral point for points normally at equal potential in the circuit interconnecting the current transformer secondaries and also connected to be energized on the occurrence of an earth fault on the star side of the system by a current proportional to the current in the earth connection of the star side of the system.

4. A protective arrangement for a star delta connected transmission system comprising groups of current transformers connected respectively in delta on the star-connected side of the system and in star on the delta connected side of the system, said groups of current transformers being interconnected for circulating current, circuit controlling means for controlling said transmission system, and means comprising relays and transforming means for controlling said circuit controlling means including windings connected across normally equipotential points of said circulating current connections for causing operation of said circuit controlling means upon phase faults, and a transformer primary winding, the circuit of which leads from the star point of said star-connected group of current transformers to one of said equipotential points, and a secondary transformer winding for causing sensitive operation of said relay means to effect operation of said circuit controlling means upon ground faults in the delta-connected side of said system.

5. In a protective arrangement for a star delta connected transmission system wherein the star side of the system is connected to earth and wherein the secondaries of current transformers on the star and the delta sides of the system are connected in delta and in star respectively and interconnected for circulating current, fault responsive protective means comprising a winding connected between the neutral point of the star connected current transformer secondaries and a neutral point for points normally at equal potential in the circuit interconnecting the current transformers so as to be energized by current proportional to the resultant of the currents in the star connected current transformer secondaries and also connected to be energized in accordance with the current in the earth connection of the star side of the system whereby to effect operation of the protective means on the occurrence of an earth fault on either side of the system.

6. A protective arrangement for a star-delta transmission system wherein the neutral of the star side of the system is connected to earth and wherein the secondaries of current transformers on the star and the delta sides of the system are connected in delta and in star respectively and interconnected for circulating current, comprising a current transformer in the earth connection of the star side of the system, and fault responsive protective means for controlling the transmission system having a plurality of windings connected in star across normally equipotential points of the circuit interconnecting the current transformer secondaries and a winding responsive to earth faults on both the delta and the star sides of the system connected between the neutral points of the star connected current transformers and said plurality of windings and connected to be energized on the occurence of an earth fault on the star side of the system by current proportional to the current in the secondary of the current transformer in the earth connection of the star side of the system.

7. In a protective system for a star-delta connected power transformer wherein the neutral of the star side is connected to earth and wherein the secondaries of current transformers on the star and the delta sides of the system are connected in delta and in star respectively and interconnected for circulating current, fault responsive protective means comprising a transformer having a winding connected to be energized by current proportional to the current in the earth connection of the star side of the power transformer for securing sensitive operation of the protective means on the occurence of an earth fault on the star side of the power transformer.

8. In a protective system for a star-delta connected power transformer wherein the neutral point of the star side is connected to earth and wherein the secondaries of current transformers on the star and the delta sides of the power transformer are connected in delta and in star respectively and interconnected for circulating current, fault responsive protective means, comprising a transformer having a winding connected between the neutral point of the star connected current transformer secondaries and a neutral point for points normally at equal potential in the circuit interconnecting the current transformer secondaries for securing sensitive operation of the protective means on the occurrence of an earth fault on the delta side of the power transformer and also connected to be energized by current proportional to the current in the earth connection of the star side of the power transformer for securing sensitive operation on the occurrence of an earth fault on the star side of the power transformer.

9. In a protective system for a star-delta connected power transformer wherein the secondaries of current transformers on the star connected side of the power transformer are connected in delta and secondaries of current transformers on the delta side of the power transformer are connected in star and wherein said delta and star connected current transformer secondaries are interconnected normally for circulating current, a summation transformer comprising a plurality of primary windings connected in series with the delta connected current transformer secondaries.

10. In a protective system for alternating current apparatus having star connected and delta connected windings wherein the secondaries of current transformers on the star and the delta sides of the apparatus are connected in delta and in star respectively and interconnected normally for circulating current, electroresponsive means comprising operating windings connected in star across normally equipotential points of the circuit interconnecting the current transformer secondaries, and a summation transformer comprising a plurality of primaries in series relation with the delta connected current transformer secondaries, another primary connected between the common points of the star connected current transformer secondaries and said operating windings, and a secondary arranged to be excited by said plurality of primaries on the occurrence of an earth fault on the star connected side of the apparatus and by said other primary on the occurrence of an earth fault on the delta connected side of the apparatus.

11. A differential protective system for a star-delta connected power transformer and the like wherein the secondaries of current transformers on the star and the delta sides of the power transformer are connected in delta and in star respectively, comprising interphase fault relays having windings connected in star across normally equipotential points of the circuit interconnecting the current transformer secondaries, a summation transformer comprising a plurality of primaries connected in series with the delta connected current transformer secondaries, and an earth fault relay arranged to be energized in accordance with the resultant excitation of said plurality of primaries.

12. In a protective system for alternating current apparatus having star connected and delta connected windings wherein the secondaries of current transformers on the star and the delta sides of the apparatus are connected in delta and in star respectively and interconnected normally for circulating current, a summation transformer comprising a plurality of primaries connected in series with the delta connected current transformer secondaries, another primary connected to be energized on the occurrence of an earth fault on the star connected side of the apparatus and arranged to oppose the effect of said plurality of primaries and a secondary arranged to be excited by the combined effect of said primaries.

13. In a protective system for alternating current apparatus having star connected and delta connected windings wherein the neutral point of the star connected windings is earthed and wherein the secondaries of current transformers on the star and the delta sides of the apparatus are connected in delta and in star respectively, electroresponsive means comprising operating windings connected in star across normally equipotential points of the circuit interconnecting the current transformer secondaries, and a summation transformer comprising a plurality of primaries in series relation with the delta connected current transformer secondaries, another primary connected between the common points of the star connected current transformer secondaries and said operating windings, a third primary connected to be energized on the occurrence of an earth fault on the star connected side of the apparatus and arranged to oppose the effect of said plurality of primaries and a secondary arranged to be excited by the combined effect of said plurality of primaries and said third primary on the occurrence of an earth fault on the star connected side of the apparatus and by said other primary on the occurrence of an earth fault on the delta connected side of the apparatus.

In witness whereof I have hereunto set my hand this 7th day of February, 1925.

ALAN S. FITZ GERALD.